(12) United States Patent
Seigler et al.

(10) Patent No.: US 6,713,237 B2
(45) Date of Patent: Mar. 30, 2004

(54) SINGLE LAYER LIFT-OFF METHOD FOR MAKING AN ELECTRONIC DEVICE

(75) Inventors: Michael Allen Seigler, Pittsburgh, PA (US); Andrew Robert Eckert, Pittsburgh, PA (US)

(73) Assignee: Seagate Technology LLC, Scotts Valley, CA (US)

(*) Notice: Subject to any disclaimer, the term of this patent is extended or adjusted under 35 U.S.C. 154(b) by 286 days.

(21) Appl. No.: 09/916,106

(22) Filed: Jul. 26, 2001

(65) Prior Publication Data

US 2002/0011460 A1 Jan. 31, 2002

Related U.S. Application Data

(60) Provisional application No. 60/221,481, filed on Jul. 27, 2000.

(51) Int. Cl.$^7$ .............................. G03F 7/00; G11B 5/39
(52) U.S. Cl. ...................... 430/314; 430/320; 430/329; 360/313; 29/603.07
(58) Field of Search ................................ 430/320, 315, 430/324, 329, 314, 323; 29/603.07, 603.08

(56) References Cited

U.S. PATENT DOCUMENTS

| | | |
|---|---|---|
| 3,957,552 A | 5/1976 | Ahn et al. |
| 4,814,258 A | 3/1989 | Tam |
| 4,940,511 A | 7/1990 | Fontana, Jr. et al. |
| 4,992,901 A | 2/1991 | Keel et al. |
| 5,079,035 A | 1/1992 | Krounbi et al. |
| 5,495,378 A | 2/1996 | Bonyhard et al. |
| 5,554,488 A | 9/1996 | Rioux |
| 5,654,128 A | 8/1997 | Hsu |
| 5,664,316 A | 9/1997 | Chen et al. |
| 5,669,133 A | 9/1997 | George |
| 5,737,155 A | 4/1998 | George et al. |
| 6,201,669 B1 | 3/2001 | Kakihara |

FOREIGN PATENT DOCUMENTS

| | | | |
|---|---|---|---|
| JP | 59-047740 A | * | 3/1984 |
| JP | 60-043831 A | * | 3/1985 |

OTHER PUBLICATIONS

R. Hsiao, "Fabrication of Magnetic Recording Heads and Dry Etching of Head Materials," *IBM Journal of Research & Development*, vol. 43, No. 1/2, 1999, pp. 1–14.

* cited by examiner

*Primary Examiner*—John A. McPherson
(74) *Attorney, Agent, or Firm*—Robert P. Lenart, Esq.; Pietragallo, Bosick & Gordon

(57) ABSTRACT

A method for making a magnetic sensor for a disk drive read head, the method comprising the steps of depositing a magnetoresistive stack on a surface of a first layer of material, depositing a resist layer on a first portion of the magnetoresistive stack, removing a second portion of the magnetoresistive stack not covered by the resist layer, depositing a layer of additional material on the magnetoresistive stack, the resist material, and the surface of the first layer, removing the additional material from sidewalls of the resist material, and using a lift-off process to remove the resist material. Magnetic sensors made by the above process are also included. A method for making a semiconductor device is also provided, the method comprising the steps of depositing a layer of first material on a surface of substrate, depositing a resist layer on a first portion of the first material, removing a second portion of the layer of the first material not covered by the resist layer, depositing a layer of additional material on the first material, the resist layer, and the surface of the substrate, removing the additional material from sidewalls of the resist layer, and using a lift-off process to remove the resist layer.

15 Claims, 4 Drawing Sheets

SINGLE LAYER LIFT-OFF METHOD FOR MAKING AN ELECTRONIC DEVICE

CROSS REFERENCE TO RELATED APPLICATION

This application claims the benefit of U.S. Provisional Application No. 60/221,481, filed Jul. 27, 2000.

BACKGROUND OF THE INVENTION

This invention relates to methods for making electronic devices, and more particularly, to methods for making sensors for use in detecting magnetically encoded information in magnetic storage media.

Devices utilizing giant magnetoresistance (GMR) effects have utility as magnetic sensors, especially in read heads used in magnetic disc storage systems. The GMR effect is observed in thin, electrically conductive multi-layer systems having magnetic layers. Magnetic sensors utilizing the GMR effect are frequently referred to as "spin valve" sensors.

A spin valve sensor is typically a sandwiched structure including two ferromagnetic layers separated by a thin non-ferromagnetic layer. One of the ferromagnetic layers is called the "pinned layer" because it is magnetically pinned or oriented in a fixed and unchanging direction. A common method of maintaining the magnetic orientation of the pinned layer is through anti-ferromagnetic exchange coupling utilizing a proximate, i.e. adjacent or nearby, anti-ferromagnetic layer, commonly referred to as the "pinning layer." The other ferromagnetic layer is called the "free" or "unpinned" layer because its magnetization can rotate in response to the presence of external magnetic fields.

The benefits of spin valve sensors result from a large difference in electrical conductivity exhibited by the devices depending on the relative alignment between the magnetizations of the GMR element ferromagnetic layers. In order for antiferromagnetically pinned spin valve sensors to function effectively, a sufficient pinning field from the pinning layer is required to keep the pinned ferromagnetic layer's magnetization unchanged during operation. Various anti-ferromagnetic materials, such as NiMn, FeMn, NiO, IrMn, PtPdMn, CrMnPt, RuRhMn, and TbCo, have been used or proposed as antiferromagnetic pinning layers for spin valve sensors. GMR sensors can be used to sense information encoded in magnetic storage media. In operation, a sense current is passed through a GMR stack. The presence of a magnetic field in the storage media adjacent to the sensor changes the resistance of a GMR stack. A resulting change in voltage drop across the GMR stack due to the change of the resistance of the GMR stack can be measured and used to recover magnetically stored information.

These sensors typically comprise a stack of thin sheets of a ferromagnetic alloy, such as NiFe (Permalloy), magnetized along an axis of low coercivity. The sheets are usually mounted in the head so that their magnetic axes are transverse to the direction of disc rotation and parallel to the plane of the disc. The magnetic flux from the disc causes rotation of the magnetization vector in at least one of the sheets, which in turn causes a change in resistivity of the stack.

The output voltage is affected by various characteristics of the sensor. The sense current can flow through the stack in a direction that is perpendicular to the planes of the stack strips, i.e. current-perpendicular-to-plane or CPP, or the sense current can flow through the stack in a direction that is parallel to the planes of the stack strips, i.e. current-in-plane or CIP. The CPP operating mode can result in higher output voltage than the CIP operating mode. Higher output voltages permit greater precision and sensitivity of the read sensor in sensing magnetic fields from the magnetic medium. Therefore, it is desirable to maximize the output voltage of the read sensor.

In an effort to achieve greater magnetic storage capacity, the size of magnetic recording heads is continually being reduced. The lithographic process of lift-off has been a standard process in magnetic recording head fabrication for many years.

The standard lift-off process as used to define the stripe width in an abutted junction magnetic recording head includes the following steps. First a spin valve film stack is deposited on a layer of material commonly referred to as a first half gap. A dual layer resist is applied to the film. The bottom layer of the resist is undercut with respect to the top layer of the resist. Ion milling is used to remove the spin-valve film stack that is not protected by the dual layer resist, down to the first half gap material. Ion beam deposition can be used to deposit a layer of permanent magnet and lead material over the surface of the first half gap and the dual layer resist. Because the bottom layer of the resist is undercut with respect to the top layer, the permanent magnet and lead material does not coat the sides of the bottom layer of the resist. Thus the sides of the bottom layer of the resist and the overhang of the top layer of the resist are exposed so that solvents can be used to attack the resist layers and lift-off the permanent magnet and lead material that coats the dual layer resist above the spin valve film stack.

A dual layer resist process for use in making magnetic recording heads is disclosed in U.S. Pat. No. 5,669,133, the disclosure of which is hereby incorporated by reference. A dual layer resist technique has been used in the past because material deposited after the resist will coat the sidewalls of the resist. Without the dual layer undercut, solvents could not penetrate the material on the sidewalls of the resist to dissolve the resist.

Problems arise when one attempts to extend the dual layer process to very small dimensions. The undercut needs to be big enough to form an area where no permanent magnet and lead material metal is deposited, so that the resist stripper can make contact with the bottom resist layer to dissolve it. With very narrow structures, this undercut can become a significant portion of the total width of the resist structure. This causes the resist structure to become unstable and fall over. Complicating this even more is that the rate at which the bottom layer undercuts the top layer is not perfectly controllable. Even when the structure would be stable if the correct undercut amount is achieved, the non-uniformity of the process would make it unsuitable for manufacturing.

There is a need for a magnetic recording head fabrication process that does not require the use of a dual layer resist.

SUMMARY OF THE INVENTION

This invention provides a method for making a magnetic sensor for a disk drive read head, the method comprising the steps of depositing a magnetoresistive stack on a surface of a first layer of material, depositing a resist layer on a first portion of the magnetoresistive stack, removing a second portion of the magnetoresistive stack not covered by the resist layer, depositing a layer of additional material on the magnetoresistive stack, the resist material, and the surface of the first layer, removing the additional material from sidewalls of the resist material, and using a lift-off process to remove the resist material. Magnetic sensors made by the above method are also included.

More generally, the invention provides a method for making a semiconductor device, the method comprising the steps of depositing a layer of first material on a surface of substrate, depositing a resist layer on a first portion of the first material, removing a second portion of the layer of the first material not covered by the resist layer, depositing a layer of additional material on the first material, the resist layer, and the surface of the substrate, removing the additional material from sidewalls of the resist layer, and using a lift-off process to remove the resist layer. Semiconductor devices made by the above method are also included.

DESCRIPTION OF THE PREFERRED EMBODIMENTS

Figure 1:
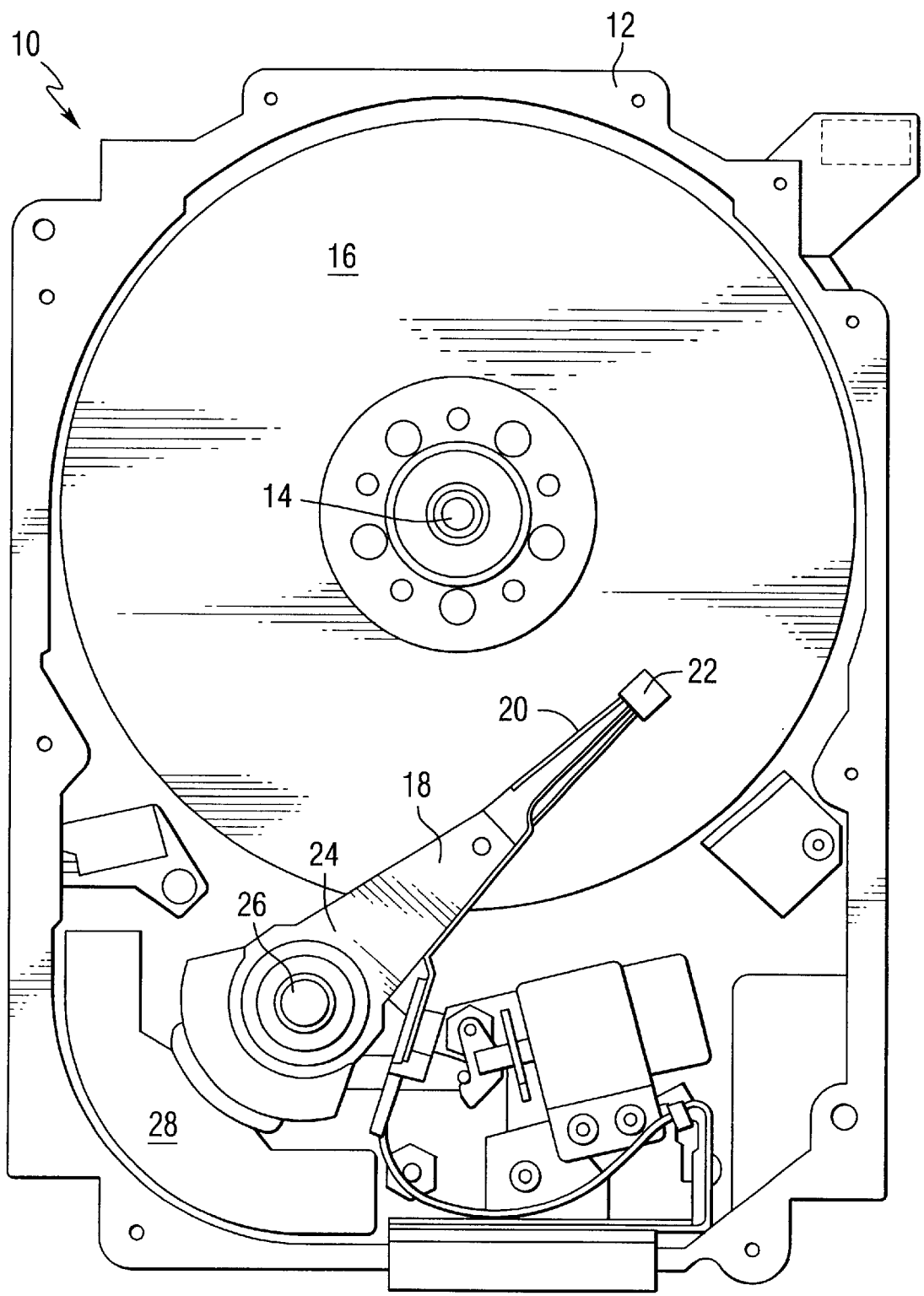
FIG. 1 is a pictorial representation of a disk drive that can use magnetic sensors constructed using this invention.

In its preferred embodiment, the present invention provides a method for making improved magnetic sensors for use with magnetic recording media. Sensors constructed in accordance with the invention are particularly suitable for use within disc drives for computers. FIG. 1 is a pictorial representation of a typical disk drive 10 that can utilize magnetic sensors constructed in accordance with this invention. The disk drive includes a housing 12 (with the upper portion removed and the lower portion visible in this view) sized and configured to contain the various components of the disk drive. The disk drive includes a spindle motor 14 for rotating at least one magnetic storage medium 16 within the housing, in this case a magnetic disk. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disk 16. The actuator motor 28 is regulated by a controller that is not shown in this view and is well known in the art.

Figure 2:
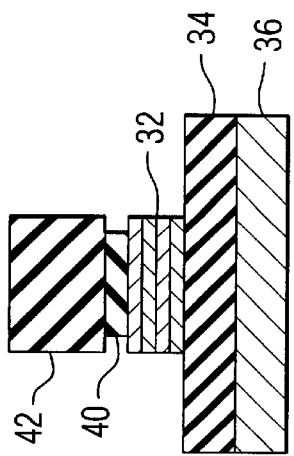
FIGS. 2 through 6 illustrate prior art steps of making a magnetic sensor using a dual layer resist lift-off process.
Figure 3:
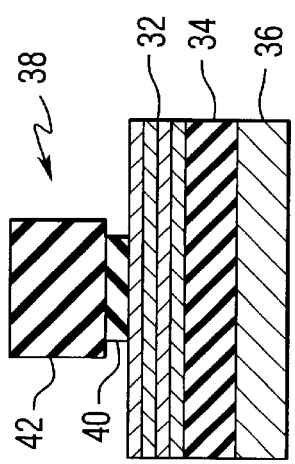
Figure 4:
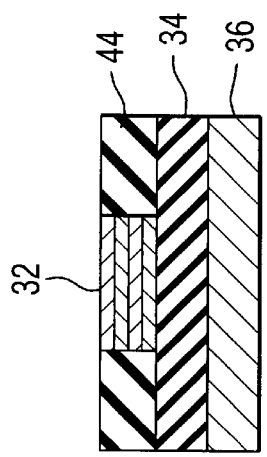
Figure 5:
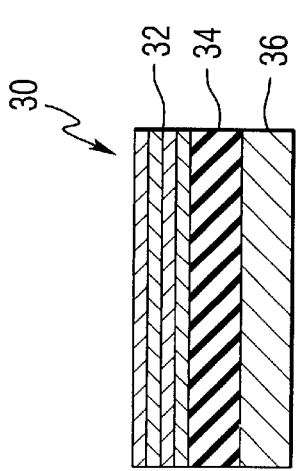
Figure 6:
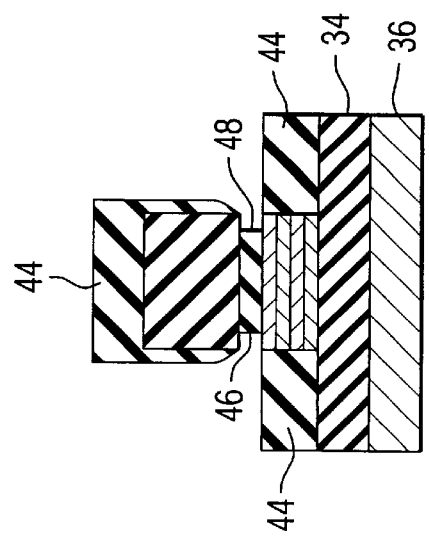

In order to understand the present invention, it is useful to review the prior art device fabrication process as illustrated in FIGS. 2 through 6. FIG. 2 is a cross-sectional view of an intermediate stage 30 in the formation of a sensor wherein layers of a giant magnetoresistive (GMR) stack 32 have been deposited on the surface of a half gap layer 34, that is in turn supported on the surface of a bottom shield layer 36. To form this structure, layers of the giant magnetoresistive stack 32 are typically deposited on the entire surface of the half gap layer. FIG. 3 shows that a dual layer resist 38 is applied to a surface of the giant magnetoresistive stack 32. The bottom layer 40 of the dual layer resist is undercut with respect to the top layer 42. Next, ion milling is used to remove the GMR stack that is not protected by the dual layer resist, down to the surface of the first half gap material to produce the structure shown in FIG. 4. A layer of permanent magnet and lead material 44 is deposited, for example by ion beam deposition or sputter deposition, over the surface of the fist half gap layer and the dual layer resist as shown in FIG. 5. Because the bottom layer of the resist is undercut with respect to the top layer, the permanent magnet and lead material does not coat the sides of the bottom layer 40 or the overhangs of the top layer of the resist. Thus the sides 46, 48 of the bottom layer 40 of the resist and the overhangs of the top layer 42 are exposed so that solvents can be used to attack the resist and lift-off the permanent magnet and lead material that coats the dual layer resist above the GMR stack to achieve the structure shown in FIG. 6.

In order to construct sensors that operate with magnetic media having increased data storage densities, sensors having small GMR elements are required. As the desired width of the GMR strip is reduced, the width of the bottom layer of the dual layer resist can become so small that the dual layer resist structure becomes unstable. In general, lift-off processing has been avoided for very small structures due to the instability of dual layer resists at line widths near and below 100 nm.

Figure 7:
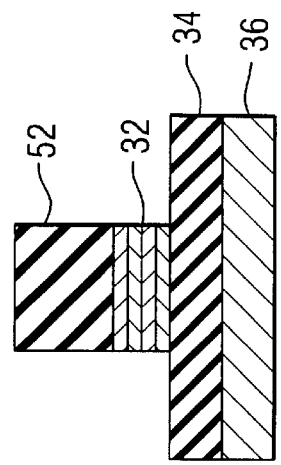
FIGS. 7 through 12 illustrate the steps of this invention used to make a magnetic sensor.
Figure 8:
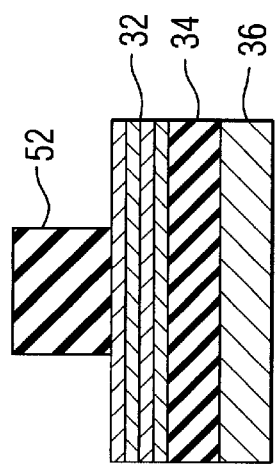

FIGS. 7 through 11 illustrate the steps in the method of the present invention. FIG. 7 is a cross-sectional view of an intermediate stage 50 in the formation of a sensor wherein layers of a giant magnetoresistive stack 32 have been deposited on the surface of a first layer of material 34, which in this embodiment is a half gap layer, that is in turn supported on the surface of a bottom shield layer 36. The half gap layer is typically comprised of alumina, AlON, AlN, SiO$_2$, SiN, SiON, with alumina being the most common, and the bottom shield is typically comprised of NiFe (Permalloy). To form this structure, layers of the giant magnetoresistive stack are typically deposited on the entire surface of the half gap layer 34. FIG. 8 shows that a single layer resist 52 is applied to a surface of the giant magnetoresistive stack 32. The resist layer can comprise any of numerous known resists, including photoresist, ultraviolet resist, electron beam resist, or x-ray resist. In this embodiment, the sidewalls of the resist are straight and substantially perpendicular (or normal) to the plane of the surface of the half gap layer. The sidewalls do not need to be straight or perpendicular as long as the material can be removed from the sidewalls preferentially.

Figure 9:
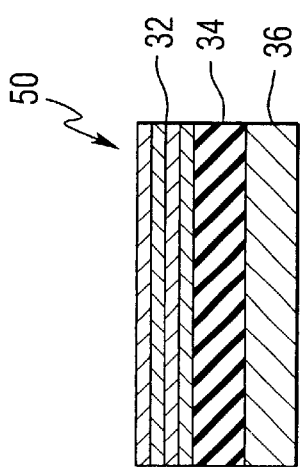
Figure 10:
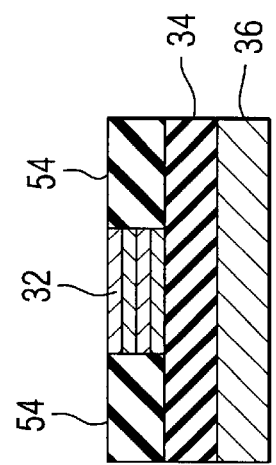

Next, the GMR stack that is not protected by the single layer resist is removed, for example by ion milling down to the first half gap material to produce the structure shown in FIG. 9. A layer of additional material 54, that includes permanent magnet and lead material in this embodiment, is deposited, for example by ion beam deposition, over the surface of the first half gap and the single layer resist as shown in FIG. 10. The permanent magnet material can include, for example, some CoPtX alloy where X can be nothing or Cr, B, or Ta. The lead material can comprise, for example, Au, Ta, Cu, or Rh. The permanent magnet is used to bias and stabilize the free layer of the spin-valve and the lead material is used to make a low electrical resistance path to the sensor.

Figure 11:
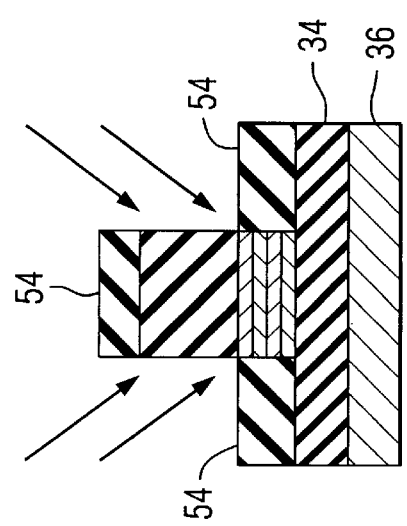
Figure 12:
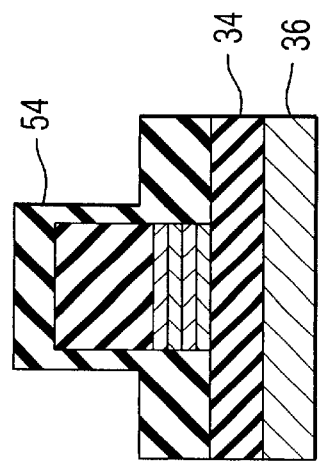

Next, the permanent magnet and lead material 54 that has accumulated on the sides of the single layer resist is removed. Removal of this material from the sidewalls of the resist could be accomplished, for example by using ion milling at an angle with respect to the wafer's normal direction, as illustrated in FIG. 11. The angle with respect to the sidewall should be large, so that the ions incident upon the wafer are coming in at a grazing angle with respect to the wafer surface. The angle would be chosen so that the permanent magnet and lead material is removed from the sidewalls of the resist at a rate that is comparable to or much larger than the rate at which it is being removed from the rest of the wafer. This will allow cleaning of the sidewalls of the resist without removing all of the permanent magnet and lead material from the rest of the wafer. Once the sidewalls of the resist are cleaned, the structure is subjected to a solvent that permits lift-off of the resist and any permanent magnet and lead material that remains on the top of the resist. After the resist has been removed, the resulting structure is shown in FIG. 12.

Other techniques for removing the permanent magnet and lead material 54 on the sides of the resist can also be used. For example, various etchants can be used to remove the additional material. Some etchants are isotropic, that is, they etch at the same rate in all directions. If isotropic etchants are used, the material on the sidewalls of the resist should be much thinner than the material deposited on the surface of the first half gap layer. This can be accomplished by using a directional deposition technique to deposit the permanent magnet and lead material, such as ion beam deposition, collimated sputtering, evaporation, or deposition by laser ablation. Some isotropic etch methods include reactive ion etching, wet chemical etching, and possibly sputter etching.

Other etchants are anisotropic, that is, they etch much differently at different angles or directions. If anisotropic etchants are used, the material thickness on the side-wall might not be as critical as long as the etch process is set up to remove the material from the side-walls much faster than it removes the material from the surface of the first half gap layer. Some anisotropic etch processes include ion milling (also called ion beam etching), chemically assisted ion beam etching, reactive ion beam etching, and reactive ion etching. With different parameters or materials reactive ion etching can range from isotropic to anisotropic. For angle dependent processes such as IBE, CAIBE and RIBE the ideal etch angle is highly dependent on the material being etched and the angle of the resist wall. Since the etch rate can vary significantly with angle, the etch angle can be anywhere from 15° to 80° with respect to the surface of the half gap layer, depending on the material, for a PR wall that is substantially perpendicular to the first half gap surface.

This invention provides a process in which a single layer resist is used in a lift-off process. This process has allowed the lift-off of approximately 1000-Angstrom thick films and stripe widths of <100-nm using electron beam lithography. The process of this invention could potentially have many applications, including the fabrication of various semiconductor devices.

As illustrated in FIGS. 7 through 12 the method of this invention can be used to make a spin valve sensor starting with a spin-valve stack deposited on the first half gap material. The stack is patterned using a single layer resist. The sheets of the spin-valve stack that are not under the resist are removed, for example, by ion milling down to the surface of the first half gap. A layer of permanent magnet and lead material is deposited using, for example, ion beam deposition. The deposited layer of permanent magnet and lead material is cleaned from the sidewalls of the resist. This cleaning could be accomplished by, for example, ion milling at an angle with respect to the surface of the half gap material to clean the permanent magnet and lead material off the sidewalls of the resist. The layer of permanent magnet and lead material remaining on the top of the resist is then lifted off along with the resist. The step of cleaning of the deposited material from the sidewalls of the resist makes the single layer resist lift-off possible.

Figure 13:
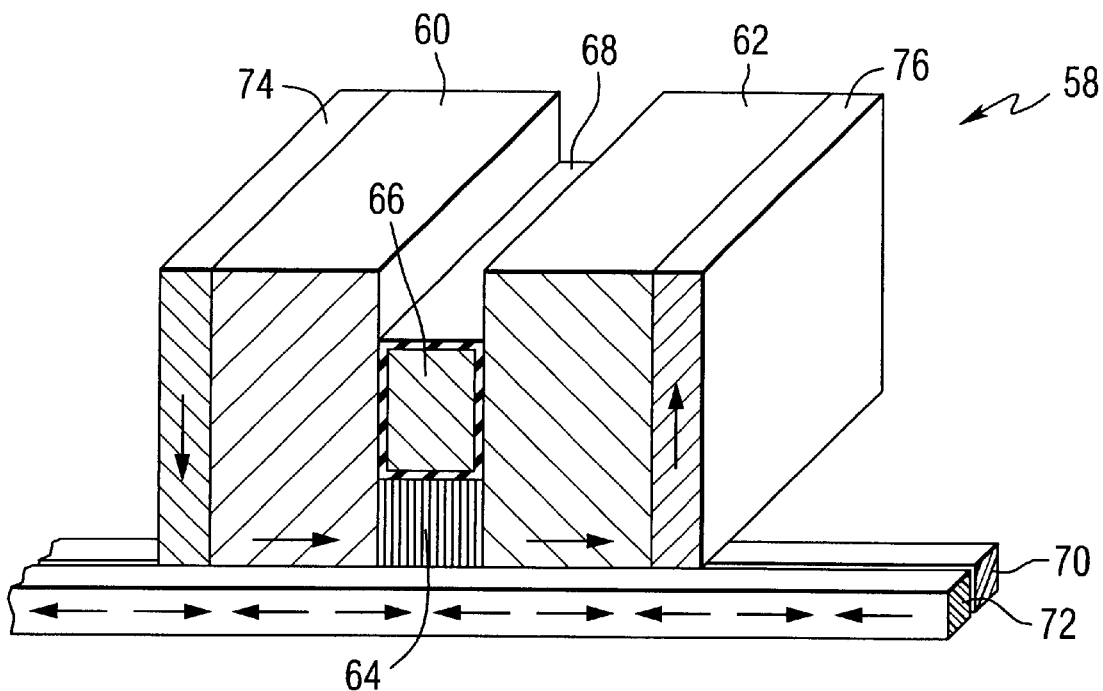
FIG. 13 is a cross-sectional view of a portion of a magnetic sensor that can be constructed using this invention.

FIG. 13 is a cross-sectional view of a portion of a computer disc drive head assembly including a magnetic sensor 58 that can be constructed using this invention. The assembly includes first and second conductive shields 60 and 62 positioned on opposite sides of a giant magnetoresistive stack 64. A permanent magnet 66 is encased in an insulating material 68 and positioned above the giant magnetoresistive stack. The assembly is configured to fly adjacent to a magnetic recording medium having a plurality of tracks, illustrated by tracks 70, 72. The tracks contain magnetic domains capable of storing digital information according to the polarity of magnetization thereof. The magnetic domains are illustrated by arrows in the tracks. Conductors 74 and 76 are positioned adjacent to shields 60 and 62 respectively and are used to supply a constant current, I, that flows through the shields and the GMR stack in a current perpendicular to the plane direction. Conductors 74 and 76 have a lower electrical resistance than the shields. When the GMR stack is subjected to an external magnetic field, the resistance of the stack changes, thereby changing the voltage across the stack. The stack voltage is then used to produce an output voltage.

FIGS. 7 through 12 are cross sectional views of various structures produced during the fabrication of a GMR sensor. The plane of the cross sections in FIGS. 7–12 would lie in a plane perpendicular to the plane used for the cross section of FIG. 13.

Figure 14:
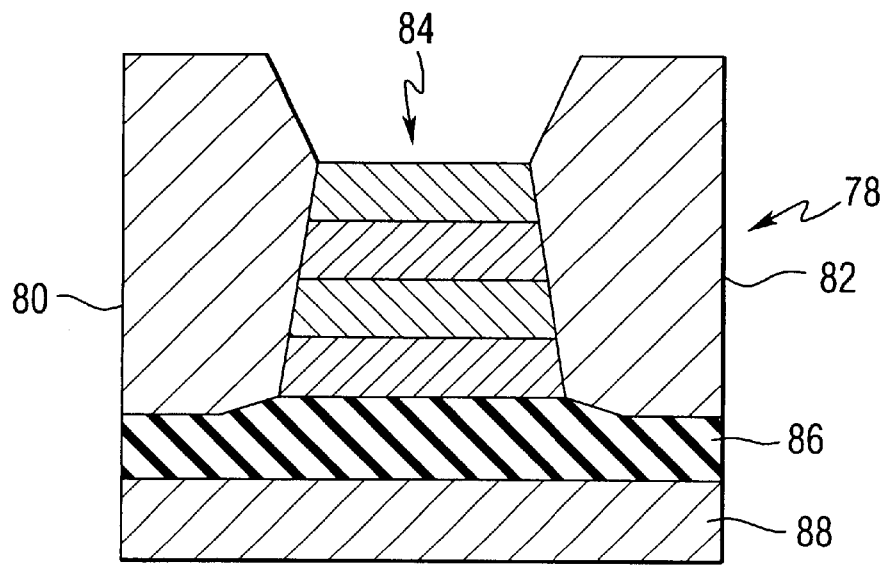
FIG. 14 is a cross-sectional view of a portion of another magnetic sensor that can be constructed using this invention.

FIG. 14 is a cross-sectional view of a portion of another magnetic sensor 78, in the form of an abutted junction sensor, which can be constructed in accordance with this invention. The sensor includes first and second contacts 80 and 82, including permanent magnet and lead material, positioned on opposite sides of a giant magnetoresistive stack 84. Contacts and permanent magnets 80 and 82 are positioned to supply a constant current that flows through the GMR stack in a current parallel to the plane direction. When the GMR stack is subjected to an external magnetic field, the resistance of the stack changes, thereby changing the voltage across the stack. The stack voltage is then used to produce an output voltage.

The single layer resist lift-off process has been demonstrated using a multilayer GMR element, patterned using electron beam lithography. A layer of $Al_2O_3$ was ion beam deposited onto the GMR element, resist and substrate surface. Ion milling was used to clean the sidewall of the resist. Then the $Al_2O_3$ layer on the resist was removed using a lift-off process. The smallest lines that resulted from the electron beam lithography (80 nm wide) were also lifted off using this technique. The step height between the GMR stack and the back-filled alumina was measured using a profilometer and was approximately 50 angstroms, thus very good planarization was achieved. The process was repeated using $SiO_2$ instead of the GMR stack and similar results were obtained, i.e., approximately 50 Angstroms in height difference.

This single layer resist lift-off process should allow the use of a lift-off process in the fabrication of spin-valve sensors with dimensions smaller than would be possible using the dual layer resist. It may also allow the use of a lift-off process in other head designs for use in drives having data densities beyond 100 Gbit/in$^2$.

The method of this invention has been described above in relation to the fabrication of a CIP abutted junction device. However, the process can also be used in the fabrication of other devices, such as CPP devices. For a CPP sensor the magnetoresistive stack is deposited on a first layer of material 34 comprising a bottom shield that can be made of, for example, NiFe, CoNiFe, NiFeCu, and the additional material can be an insulator such as $Al_2O_3$, AlN, AlON, $SiO_2$, $Si_3N_4$, or SiON, instead of the permanent magnet material. The rest of the processing would be the same.

This invention can also be used to build various electronic devices that include a first material that is patterned using a resist, wherein at least one layer of a second material is deposited on the resist and the first material. In this regard, the invention provides a method for making a semiconductor device, the method comprising the steps of depositing a layer of first material on a surface of substrate, depositing a resist layer on a first portion of the first material, removing a second portion of the layer of the first material not covered by the resist layer, depositing a layer of additional material on the first material, the resist layer, and the surface of the substrate, removing the additional material from sidewalls of the resist layer, and using a lift-off process to remove the resist layer.

While the present invention has been described in terms of what is at present believed to be its preferred embodiment, it will be apparent to those skilled in the art that various modifications to that disclosed embodiments can be made without departing from the invention as defined by the following claims.

What is claimed is:

1. A method for making a magnetic sensor for a disk drive read head, the method comprising the steps of:

depositing a magnetoresistive stack on a surface of a first layer of material;

depositing a resist layer on a first portion of the magnetoresistive stack;

removing a second portion of the magnetoresistive stack not covered by the resist layer;

depositing a layer of additional material on the magnetoresistive stack, the resist material, and the surface of the first layer;

removing the additional material from sidewalls of the resist material; and using a lift-off process to remove the resist material.

2. A method for manufacturing a magnetic sensor for a disk drive read head according to claim 1, wherein the step of removing the additional material from sidewalls of the resist material comprises the steps of:

etching the additional material whereby the additional material positioned on the sidewalls of the resist material is removed at a rate comparable to or larger than a rate of removal of the additional material positioned on the first layer.

3. A method for manufacturing a magnetic sensor for a disk drive read head according to claim 2, wherein the step of etching the additional material comprises one of the group of:

reactive ion etching, wet chemical etching, sputter etching, ion beam etching, chemically assisted ion beam etching and reactive ion beam etching.

4. A method for manufacturing a magnetic sensor for a disk drive read head according to claim 2, wherein the step of etching the additional material comprises an angle dependent process and the etching angle is in the range of 15° to 80° with respect to a surface of the first layer.

5. A method for manufacturing a magnetic sensor for a disk drive read head according to claim 1, wherein the sidewalls of the resist are substantially perpendicular to a surface of the first layer.

6. A method for manufacturing a magnetic sensor for a disk drive read head according to claim 1, wherein the additional material comprises:

permanent magnet and lead material.

7. A method for manufacturing a magnetic sensor for a disk drive read head according to claim 1, wherein the additional material comprises:

an insulator.

8. A method for manufacturing a magnetic sensor for a disk drive read head according to claim 1, wherein the first layer of material comprises:

a half gap layer.

9. A method for manufacturing a magnetic sensor for a disk drive read head according to claim 1, wherein the first layer of material comprises:

a bottom shield.

10. A magnetic sensor made in accordance with the method of claim 1.

11. A method for making a semiconductor device, the method comprising the steps of:

depositing a layer of first material on a surface of substrate;

depositing a resist layer on a first portion of the first material;

removing a second portion of the layer of the first material not covered by the resist layer;

depositing a layer of additional material on the first material, the resist layer, and the surface of the substrate;

removing the additional material from sidewalls of the resist layer using a dry etch process whereby the additional material positioned on the sidewalls of the resist layer is removed at a rate larger than a rate of removal of the additional material positioned on the first material; and using a lift-off process to remove the resist layer.

12. A method for making a semiconductor device according to claim 11, wherein the step of etching the additional material comprises one of the group of:

reactive ion etching, high-pressure sputter etching, ion beam etching, and reactive ion beam etching.

13. A method for making a semiconductor device according to claim 11, wherein the step of etching the additional material comprises an angle dependent process and the etch angle is in the range of 15° to 80° with respect to a surface of the substrate.

14. A method for making a semiconductor device according to claim 11, wherein the sidewalls of the resist are substantially perpendicular to a surface of the substrate.

15. A semiconductor device made in accordance with the method of claim 11.

* * * * *